United States Patent
Wae

(10) Patent No.: US 6,534,955 B1
(45) Date of Patent: Mar. 18, 2003

(54) PULSE CHARGER

(75) Inventor: Ching Chuan Wae, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 10/095,709

(22) Filed: Mar. 13, 2002

(51) Int. Cl.[7] .......................... H01M 10/44; H01M 10/46
(52) U.S. Cl. ........................................................ 320/139
(58) Field of Search .................................. 320/124, 125, 320/128, 137, 139, 141, 145

(56) References Cited

U.S. PATENT DOCUMENTS 4,153,867 A * 5/1979 Jungfer et al.
5,296,797 A * 3/1994 Bartlett
5,345,162 A * 9/1994 Shiojima

* cited by examiner

Primary Examiner—Edward H. Tso
(74) Attorney, Agent, or Firm—Jacobson Holman PLLC

(57) ABSTRACT

A pulse charger that utilizes a charging strategy to compensate the physical characteristic of a secondary battery. That is, electrical current is supplied is based on the electric voltage of a secondary battery. According to the above concept, the pulse charger of the invention mainly contains: an on/off switch, a switch control circuit and a counter control circuit. The counter control circuit connects to the secondary battery to generate a resonant frequency that is in proportion to the electric voltage. The switch control circuit utilizes the resonant frequency output to control the on/off switchcounter control circuit for switching between the power and the secondary battery.

7 Claims, 3 Drawing Sheets

PULSE CHARGER

FIELD OF THE INVENTION

This invention relates to a battery charger, and particularly a pulse charger that is capable of controlling charging voltage by a counter and battery voltage feedback.

BACKGROUND OF THE INVENTION

There are two battery types: primary (non-rechargeable) batteries and secondary (rechargeable) batteries. A primary battery must be discarded after a single use, which causes environmental pollution problems. Therefore, the secondary battery has become more widely used in newly developed technologies. In general, most secondary batteries nowadays can be recharged more than one thousand times. However, this is merely an average number without consideration of the time required for charging the battery and the charging methods, i.e., a good charger and proper battery utilization affect the performance of the secondary battery. Hence, it is necessary to have a proper charger with proper utilization while using a secondary battery.

The technique of properly charging a battery manually will not be described in the content of the following; instead, it will focus on battery chargers. In general, there are three considerations for a battery charger design: extended battery life, faster recharge time, and less circuit complexity. However, it is hard to take these three conditions into consideration at the same time in practical design. Therefore, some chargers emphasize faster charging capabilities (by using higher electric current) with simplified circuits, which shortens the battery life. Some chargers emphasize longer battery life with intelligent recharging design for circuits, but a longer time is necessary to charge a battery. To sum up, most chargers on the markets cannot simultaneously meet the requirements of the aforementioned considerations.

Hence, how to achieve a balance between the aforementioned three basic requirements to design a battery charger has become a heavily focused subject to R&D technicians.

SUMMARY OF THE INVENTION

In view of the above problems, the invention provides a pulse charger that maintains a secondary battery at full charge and has no chemical residue unconverted.

According to disclosed technique, the invention provides a kind of pulse charging method. It controls pulse output current of a charger to charge a secondary battery based on a voltage value of the secondary battery. It is characteristic of the charger to have a pulse output frequency that is in direct proportion to the voltage value of the secondary battery, and the time for outputting a pulse output frequency is always the same.

According to the above-mentioned method, the object of the invention is to provide a pulse charger which includes: an on/off switch connected a power supply and a secondary battery, for switching the connection of the power supply and of the secondary battery to generate a pulse output for charging the secondary battery; a counter control circuit that connects to the secondary battery to detect the voltage value of the secondary battery and is in direct proportion to the voltage value to generate a resonant frequency; and a switch control circuit that connects with the on/off switch and the counter control circuit receiving the resonant frequency output to control the switching rate of the on/off switch.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1A:
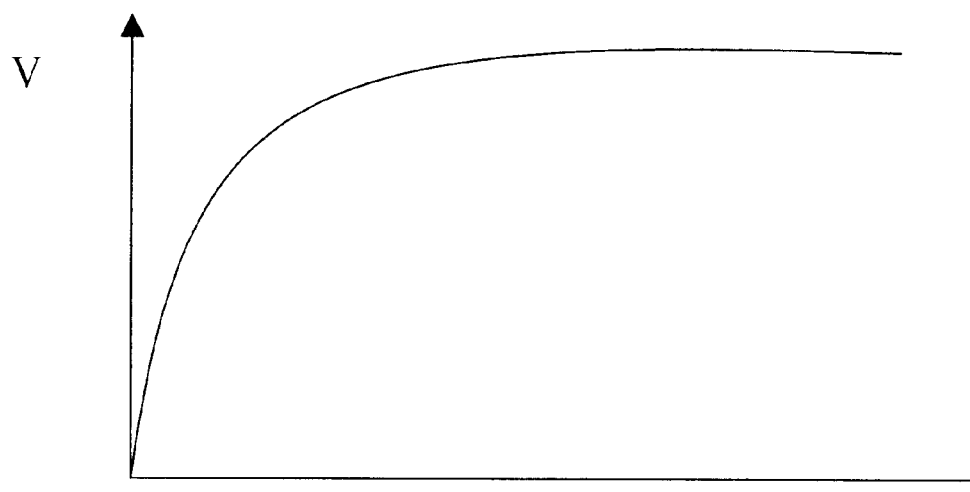
FIGS. 1A and 1B are battery-charging curves of presently known chargers.
Figure 1B:
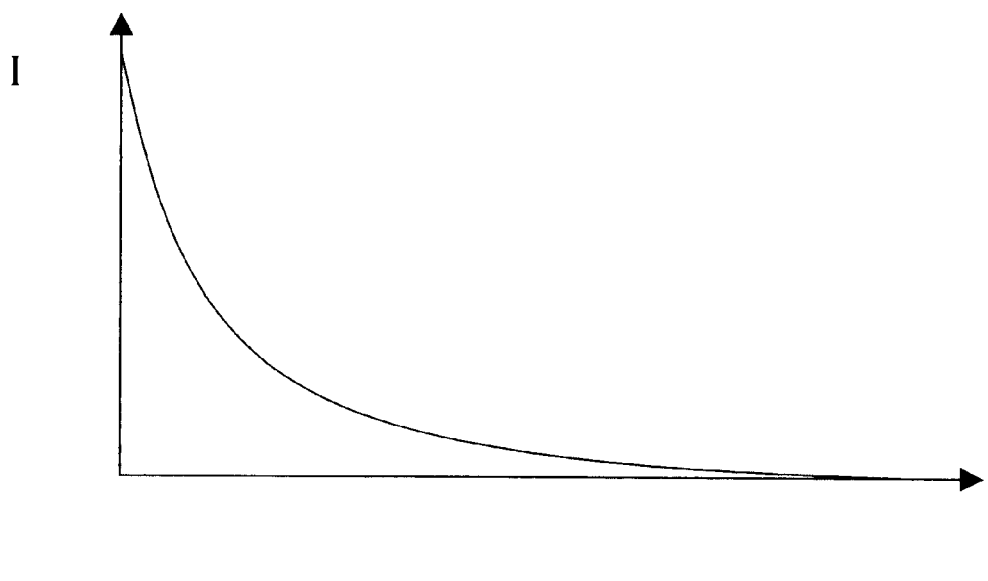

FIGS. 1A and 1B represent two kinds of recharging models. The model in FIG. 1A involves gradually increasing battery voltage, which easily generates higher resistance of the battery.

FIG. 1B is another method of charging a battery by using higher electric current at the beginning and then gradually lowering electric current. This kind of charging method often causes incomplete charging status.

Figure 2A:
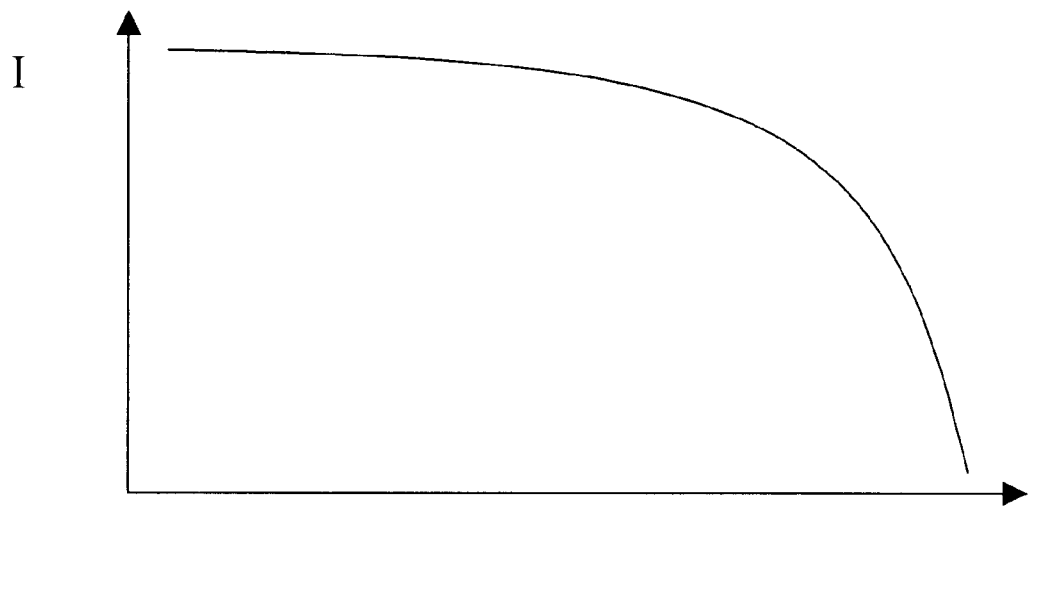
FIGS. 2A and 2B are charging strategies of the invention.
Figure 2B:
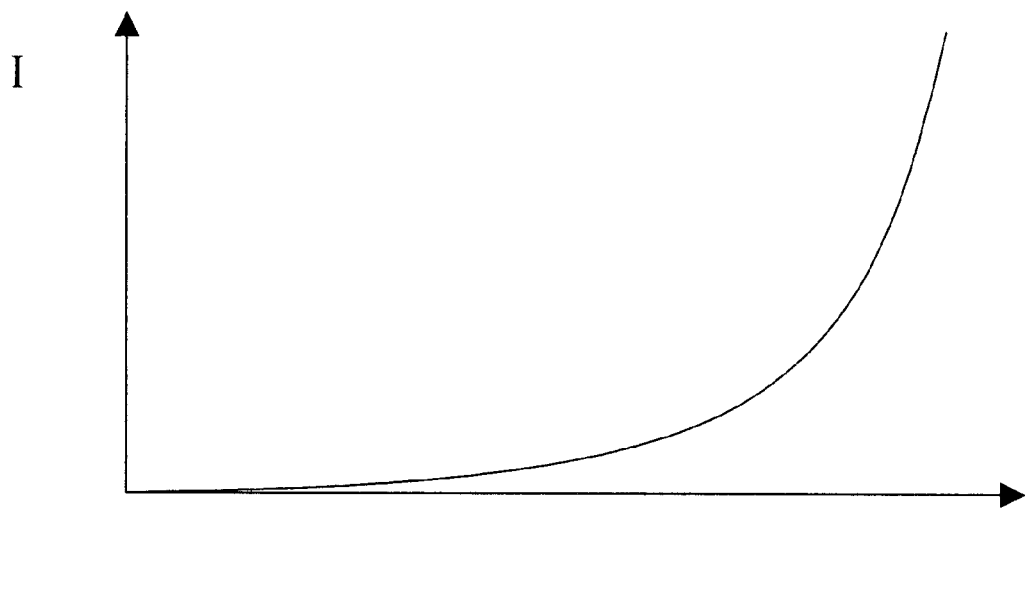

FIG. 2A is a natural charging curve of a secondary battery. It indicates that a better charging strategy for a secondary battery is to supply continuous and stable electric current, and finally to provide residual electric current for the secondary battery to reach full charge. However, it is not easy to realize for this kind of charging method. Therefore, it is better to adopt another charging method. FIG. 2B is a charging curve of the invention. First, it charges a battery using lower electric current, and then gradually increases the flow of electric current. Hence, it ensures extended battery life and full charge status of a secondary battery.

The reason for adopting the method shown in FIG. 2B is to decrease internal resistance caused by charging a battery. It focuses on the voltage value of a secondary battery for charging. The internal resistance of a secondary battery is regarded as a constant, which represents that an electric current rising accompany with an electric voltage rising. With this method a secondary battery can be charged with stable internal resistance without the problem of increasing internal resistance of a secondary battery, as shown in FIG. 1A.

The pulse charging method of the invention improves current flow problems that occur during the charging period in current secondary battery charging devices (i.e., an unbalanced battery charge during the charging period prevents a secondary battery from being fully recharged, and further generates higher internal resistance to partial cells of the secondary battery. It also means that chemical substance cannot be completely separated. Therefore, the method of the invention does not cause the problem of generating quiescent current.

According to the above theory, the invention proposes a charging solution and strategy, which utilizes a wavy pulse with a counter to charge a secondary battery. In addition, it further controls the output of electric current through battery voltage feedback. The method of wavy pulse charging involves utilizing a counter and adding a control circuit to control the on/off switch. That is, it utilizes an on/off switch to generate pulse current. After generating pulse current, it is capable of controlling the time constant of the counter and further controlling on/off times of the on/off switch by utilizing electric voltage of the positive pole or anode of a secondary battery to control the output counting frequency of the counter. The output of the control current is as shown in FIG. 2B.

Figure 3:
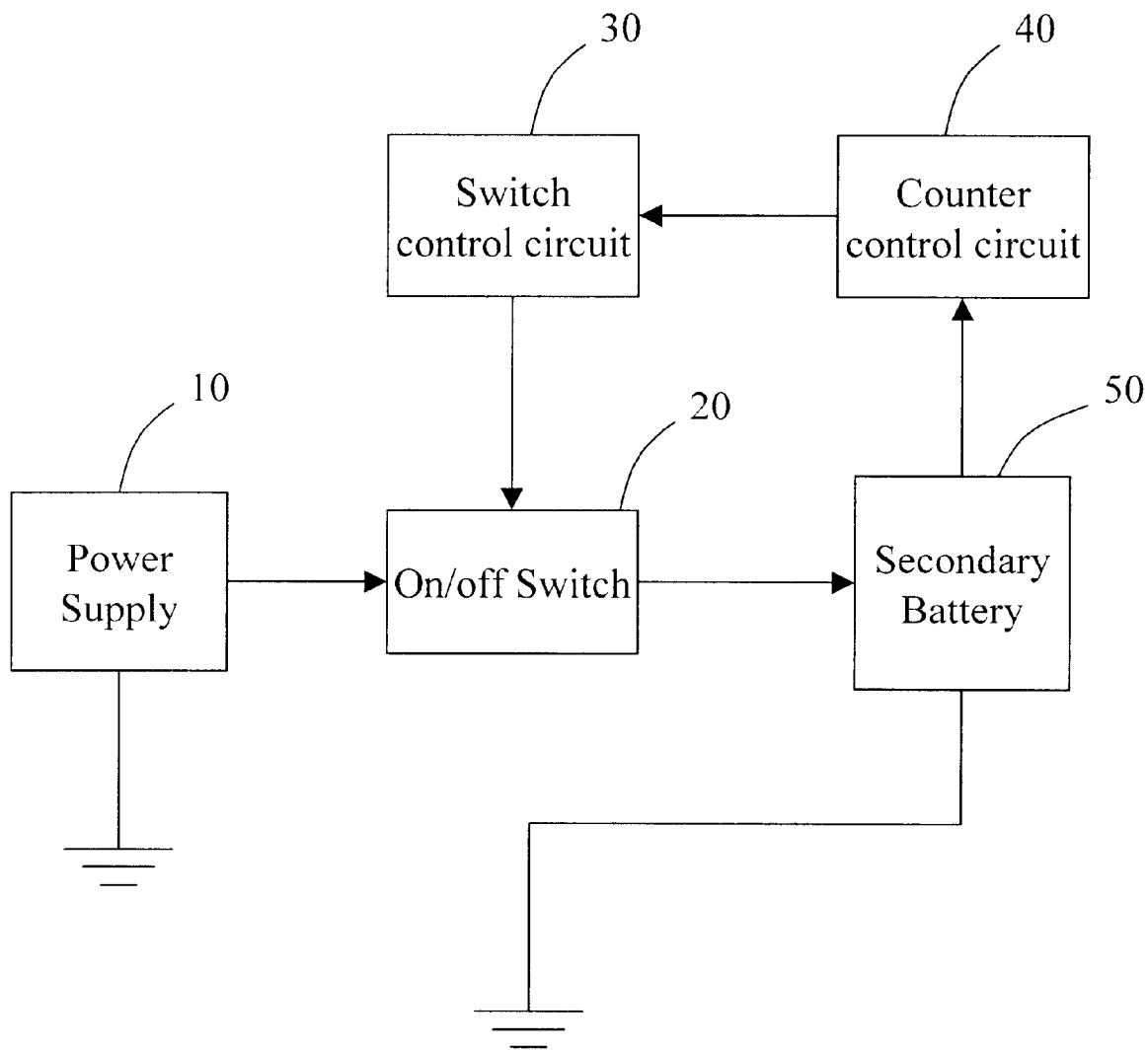
FIG. 3 is a functional block diagram of a pulse charger according to the invention.

In view of the foregoing, FIG. 3 shows the pulse charger of the invention. It contains several components:—a power supply 10, an on/off switch 20, a switch control circuit 30 and a counter control circuit 40. A description of relationships among the respective components is as follows.

Electric voltage is output through the on/off switch 20 to charge the secondary battery. The on/off switch 20 is controlled by the switch control circuit 30. The switch control circuit 30 further receives signals from the counter control circuit 40 to control the on/off switching speed. That is, it controls the (average) output of electric current by switching frequency. The counting function of the counter control circuit 40 is controlled by the output of electric voltage of the secondary battery 50.

Through the description of FIG. 3, the solution of the invention can be clearly understood. Power can be generated by adopting an AC/DC converter and a transformer to further generate stable DC output. The counter control circuit 40 can utilize an NE555 resonator and related Common-Mode Feedback (CMFB) circuit. It is able to control the resonant frequency of the NE555 resonator by simply using the output of the secondary battery 50 to control the output of the NE555 resonator. The resonant frequency is in direct proportion to the voltage value of the secondary battery 50. The resonant frequency generated by the NE555 resonator is received by the switch circuit 30 and transformed into a switch action to control the on/off switch 20.

The switch circuit can generate a counter pulse by utilizing a counter 4520. Counter frequency (pulse per unit of time) of the counter 4520 will be lower when the resonant frequency of the NE555 resonator is low. Therefore, for controlling the output of the power, outputting an on/off switch control signal to be low switch frequency of switch & control signal is a solution. For example, the time is short when it is switch on in each unit of time. In contrast, when the counter frequency of the counter 4520 is high, the electric voltage of the secondary battery 50 is high. When the counter 4520 generates a cycle, it outputs a switch on signal; one signal per cycle. Therefore, it controls the power output by controlling the on/off switch 20 according to the resonant frequency of NE555 resonator.

In addition, the on/off switch 20 can be made by adopting the MOS 2N7002.

THE EFFECTIVENESS OF THE INVENTION

The pulse charger of the invention is capable of fully charging a secondary battery without increasing the internal resistance of the battery.

As previously stated, detailed embodiments of the invention are disclosed herein; however, it is to be understood that the disclosed embodiments are merely exemplary of the invention that may be embodied in various forms. These and other variations, which will be understood by those skilled in the art, are within the intended scope of the invention as claimed below.

What is claimed is:

1. A pulse charger for charging a secondary battery, comprising:
    an on/off switch connected a power supply and the secondary battery, for switching the connection of the power supply and the secondary battery to generate a pulse output for charging the secondary battery;
    a counter control circuit connected with the secondary battery to detect an electric voltage of the secondary battery and generate a resonant frequency output in proportion to the electric voltage; and
    a switch control circuit connected with the on/off switch and the counter control circuit to receive the resonant frequency output for controlling a switching rate of the on/off switch.

2. The pulse charger of claim 1, wherein the power includes a converter and a transformer.

3. The pulse charger of claim 1, wherein the counter control circuit includes a resonator to generate the resonant frequency output according to electric voltage of the secondary battery.

4. The pulse charger of claim 3, wherein the resonator is a resonator NE555.

5. The pulse charger of claim 1, wherein the switch control circuit includes a counter to receive the resonant frequency and output an on/off switch signal.

6. The pulse charger of claim 5, wherein the counter is a counter 4520.

7. In a method of charging a secondary battery, of the type wherein an output pulse of a charger is controlled by a electric voltage value of a secondary battery to charge the secondary battery, the improvement comprising:
    outputting the pulse in a frequency in proportion to a electric voltage of the secondary battery and the time of outputting the pulse is the same.

* * * * *